Dec. 25, 1928.  G. HELD  1,696,799
INTERNAL COMBUSTION ENGINE OF THE TWO-STROKE TYPE
Filed March 25, 1927
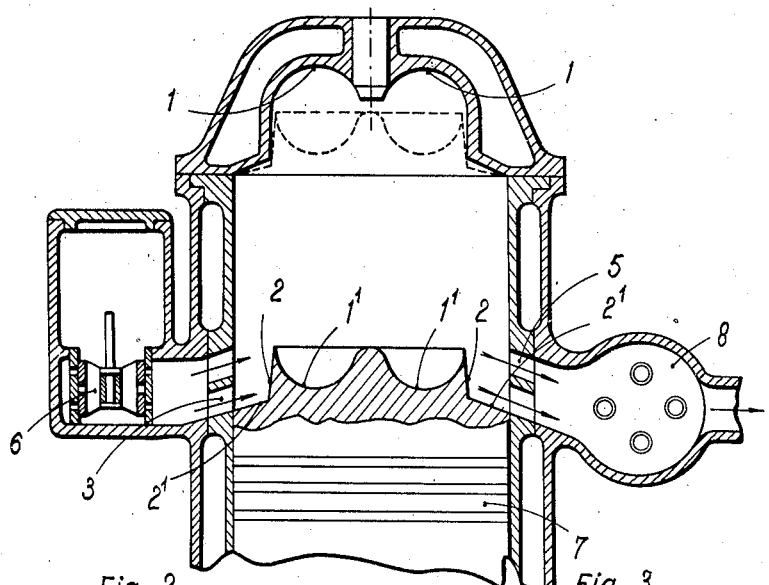
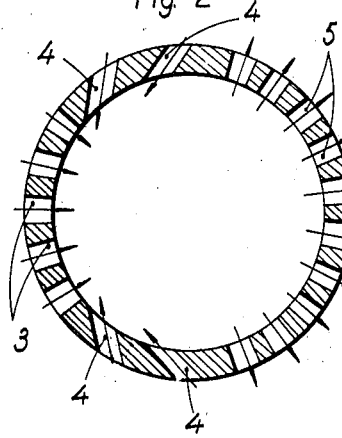
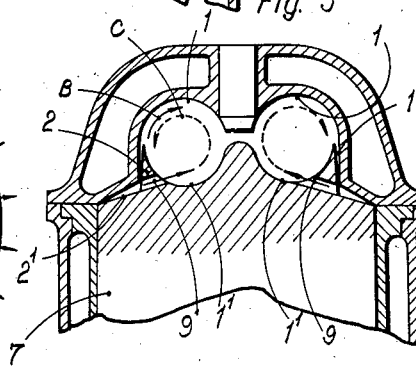
G. Held
inventor
By: Marks & Clerk
Attys.

Patented Dec. 25, 1928.

1,696,799

UNITED STATES PATENT OFFICE.

GEORGES HELD, OF BRUSSELS, BELGIUM.

INTERNAL-COMBUSTION ENGINE OF THE TWO-STROKE TYPE.

Application filed March 25, 1927, Serial No. 178,452, and in France April 12, 1926.

The present invention relates to improvements in internal combustion engines of the two stroke type by which they are enabled to operate upon heavy oil at high speeds.

The appended drawings show the characteristics of the said improvements in accordance with the invention. In these drawings, which are of a diagrammatic nature:

Fig. 1 is a vertical section of an engine cylinder and piston, according to the invention.

Fig. 2 is a cross section of the cylinder through the ports employed for scavenging purposes.

Fig. 3 is a detail modification of the cylinder head.

With reference to the said figures, the cylinder head of the two stroke engine comprising my said improvements is provided with an inverted substantially semitoroidal channel 1 the axis of which is the center line of the cylinder, and the top of the piston reciprocating in the cylinder is provided with an extension in which is formed a substantially semi-toroidal channel 1' oppositely disposed to the channel in said head, so that when the piston 7 is at the top of its upward travel, the combustion chamber thus formed will have the shape of a torus whose axis is the center line of the cylinder.

In my improved construction, the external diameter of the torus, is always less than the internal diameter of the cylinder, and is connected with the upper part of the piston 7 by two tapered portions 2 and 2'.

The inclination of the tapered portion 2' corresponds to that of the ports 3 and 5 which serve for the scavenging.

The direction of the said ports is not the same on the two sides of a vertical plane passing through the axis of the cylinder, as shown in Fig. 2. The ports 5 for the discharge of the scavenging air are all disposed in the radial direction, whereas a certain number of the inlet ports 3 are radial and the rest oblique, as shown in this figure at 4—4. The supply valve is shown at 6; 8 is the heating device which has the construction in current use for this type of engine, and these elements are not comprised in the invention.

Due to the aforesaid arrangements relative to the special form of the piston head, I provide for a constant speed of flow of the air which is discharged, during the ascent of the piston, through the annular space between the top of the piston and the bottom of the cylinder head, and this prevails as far as the dead center, since the cross section of the annular passage decreases as the piston speed decreases.

In this manner the whirling effect, which takes place in the combustion chamber, will be much improved.

I obtain a further advantage from the use of a tapered form for the piston head, due to the fact that the scavenging air entering through the inclined ports 3 impinges upon the tapered head of the piston and is upwardly deflected during the whole period of the admission of the air, so that its scavenging action is increased, since the air must again descend in order to pass through the discharge ports 5.

By reason of the said improvements, I provide the maximum passage for the air, and can thus increase the engine speed within the proper limits, and therefore reduce the weight of the engine for a given power.

Fig. 3 shows a modified construction, in which the top of the piston contains a plurality of conduits 9 whose cross section exceeds the section of the annular space 10 between the portion 2 and the cylinder head. When near the upper dead center, the major part of the air will enter the torus through the said conduits and will set up a whirling motion in the direction of C which is contrary to the rotary motion B of the air discharged from the annular space 10. The rotary motion resulting from these two rotations will have the direction of C, but by employing a cross section for the said conduits which is less than that of the said annular space, I may obtain a rotation in the direction of B.

The use of this modification will much facilitate the obtainment of the maximum speed in the torus corresponding to the maximum intimate mixture of the particles of fuel and air.

Claims:

1. In an internal combustion engine, a cylinder, a cylinder head for said cylinder, said cylinder head being provided with an inverted substantially semi-toroidal channel, and a piston adapted to reciprocate in said cylinder, the top of said piston being slightly conical and provided with a central trunconical extension, the upper diameter of which is slightly less than the outer diameter of the channel in said cylinder head, the top of said extension being provided with a substantially semi-toroidal channel oppositely disposed to the channel in said head, said channels having generatrices of equal diameters and having their directrices coinciding with each other and with the axis of said piston, whereby as the piston approaches the limit of its upward travel, a toroidal combustion chamber will be formed, a plurality of inclined conduits provided in the wall of said extension and connecting the annular space between the top portion of said piston and the side wall of the cylinder head with the channel in said piston, whereby the air entering through said conduits will effect a whirling motion of the explosive mixture inside the toroidal combustion chamber in a counter clockwise direction.

2. In an internal combustion engine, a cylinder, a cylinder head for said cylinder, said cylinder head being provided with an inverted substantially semi-toroidal channel, and a piston adapted to reciprocate in said cylinder, the top of said piston being slightly conical and provided with a central trunconical extension, the upper diameter of which is slightly less than the outer diameter of the channel in said cylinder head, the top of said extension being provided with a substantially semi-toroidal channel oppositely disposed to the channel in said head, said channels having generatrices of equal diameters and having their directrices coinciding with each other and with the axis of said piston, whereby as the piston approaches the limit of its upward travel, a toroidal combustion chamber will be formed, a plurality of inclined conduits provided in the wall of said extension, said conduits connecting the annular space between the top portion of said piston and the side wall of the cylinder head with the channel in said piston and having their cross section less than the cross section of said annular space, whereby the air entering through said conduits will effect a whirling motion of the explosive mixture inside the toroidal combustion chamber in a clockwise direction.

In testimony whereof I affix my signature.

GEORGES HELD.